(Model.)
D. LOWERS.
STONE CUTTER'S MALLET.
No. 280,050. Patented June 26, 1883.
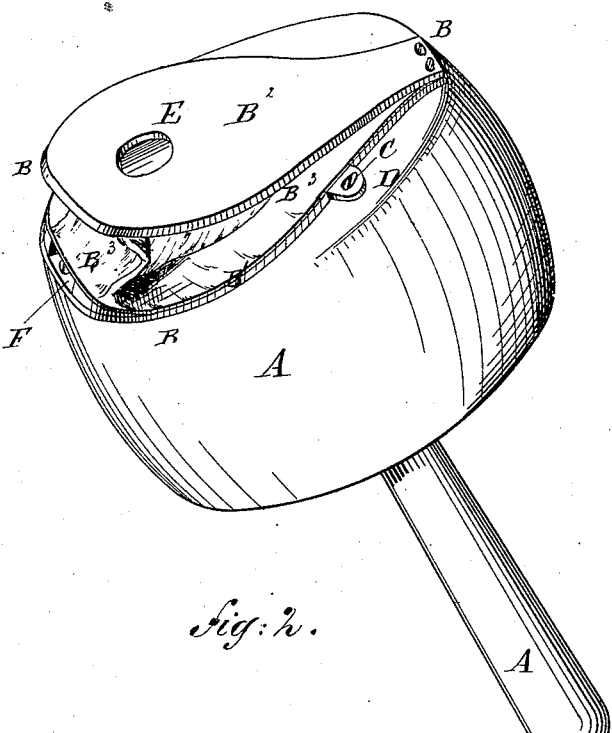
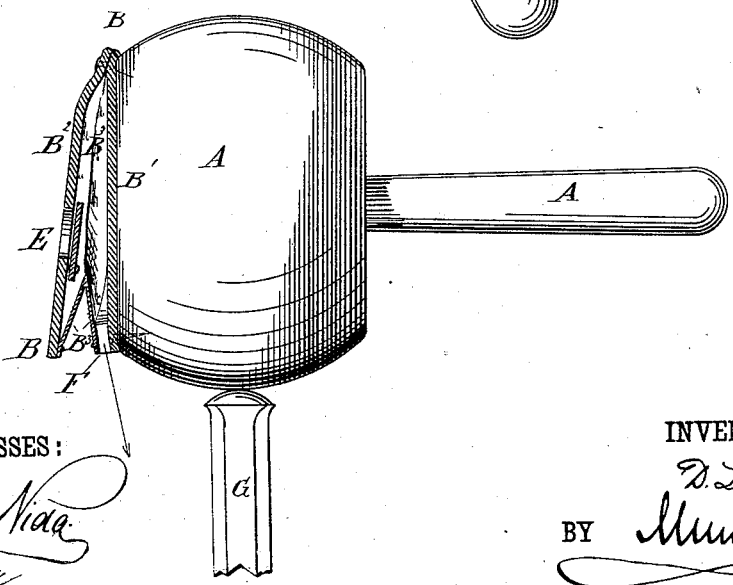
WITNESSES:
Chas. Nida
C. Sedgwick
INVENTOR:
D. Lowers
BY Munn & Co
ATTORNEYS.
N. PETERS. Photo-Lithographer. Washington, D. C.

UNITED STATES PATENT OFFICE.

DAVID LOWERS, OF SPRING VALLEY, NEW YORK.

STONE-CUTTER'S MALLET.

SPECIFICATION forming part of Letters Patent No. 280,050, dated June 26, 1883.

Application filed November 7, 1882. (Model.)

*To all whom it may concern:*

Be it known that I, DAVID LOWERS, of Spring Valley, in the county of Rockland and State of New York, have invented a new and useful Improvement in Mallets for Cutting Stone and other Purposes, of which the following is a full, clear, and exact description.

Reference is to be had to the accompanying drawings, forming part of this specification, in which similar letters of reference indicate corresponding parts in both the figures.

Figure 1 is a perspective view of my improvement. Fig. 2 is a side elevation of the same, partly in section.

The principal object of this invention is to protect workmen in stone and other substances from the dust occasioned by their tools, and also to keep the lines on which they are working clear of dust.

The invention consists in providing hammers or mallets with an attached bellows or air-blowing device so constructed and arranged that by the act of using the mallet upon a chisel in the ordinary manner a jet of air by each stroke of the tool will be directed toward the point of the chisel, so as to blow away the dust formed by the contact of the chisel with the stone or other substance composing the work on which the chisel or tool is used.

My invention may be employed in connection with hammering-instruments of various kinds; but I will only herein describe one example of its use—namely, its attachment to a stone-cutter's mallet.

A represents a stone-cutter's mallet, which is constructed in the ordinary manner. To the head of the mallet A is attached the inner plate, B', of a small bellows, B, by means of screws C, passing through lugs D, formed upon the side edges of the said inner plate, B'. The outer plate, B², of the bellows B is provided with a valve, E, in the ordinary manner, and the two plates B' B² are connected by a flexible coupling-strip, B³, of leather or other suitable material. The shanks of the plates B' B² are made narrow, and the shank of the outer plate, B² is made flexible, or is hinged so that the said outer plate will work freely. The bellows B is provided with an air-discharge opening, F, at the wider end of the inner plate, B', as shown in Figs. 1 and 2. This opening is arranged with its lips in an inclined position as respects the head of the mallet, so that any issuing jet of air will be sent in the direction of the arrow, so as to strike the surface of the stone or work at the point where the chisel G comes in contact with the work. With this construction, when the mallet A is raised by the operator in the act of striking a blow upon the chisel G, the outer plate, B², of the bellows B will be thrown outward by centrifugal force, causing the valve E to open and fill the bellows B with air. When the mallet A is brought down upon the chisel G, the outer plate, B², of the bellows B will close and the air will be forced out through the opening F, in the direction of the arrow, against the stone at the point where the chisel G acts to cut the same with such force as to blow away the dust formed by the chisel, thus cleaning the work and also protecting the workman from the dust. The lines of the work will thus also be kept visible to the operator, and he will not have to stop to brush the dust from the stone to see the lines.

When one side of the mallet A becomes worn, the bellows B may be detached and reversed, so that the other side of the mallet will receive the wear.

I have described the mallet as provided with a bellows; but any suitable air-blowing device can be used.

Having thus described my invention, what I claim as new, and desire to secure by Letters Patent, is—

1. As an improved article of manufacture, a hammering instrument or mallet made, substantially as herein shown and described, with an attached blowing device, as set forth.

2. The combination, with the head of the mallet or hammer, of a bellows adapted to discharge a jet of air upon the work at each blow of the mallet, to remove the dust, substantially as set forth.

DAVID LOWERS.

Witnesses:
SAMUEL D. HARING,
THEO. F. REED.